United States Patent
Pradhan et al.

(10) Patent No.: US 6,898,434 B2
(45) Date of Patent: May 24, 2005

(54) APPARATUS AND METHOD FOR THE AUTOMATIC POSITIONING OF INFORMATION ACCESS POINTS

(75) Inventors: Salil Pradhan, Santa Clara, CA (US); Glenn C. Steiner, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 10/021,232

(22) Filed: Oct. 30, 2001

(65) Prior Publication Data

US 2003/0083076 A1 May 1, 2003

(51) Int. Cl.[7] .............................................. H04Q 7/20
(52) U.S. Cl. ........................ 455/456.1; 455/456.5; 455/41.2; 342/450; 701/200
(58) Field of Search .................... 455/456.1, 456.5, 455/41.1, 41.2, 41.3; 342/450, 458, 463, 464, 465; 701/200, 207, 217

(56) References Cited

U.S. PATENT DOCUMENTS 5,930,726 A * 7/1999 Fujita .......................... 455/555
6,505,045 B1 * 1/2003 Hills et al. ................... 455/449
6,636,737 B1 * 10/2003 Hills et al. ................... 455/450

* cited by examiner

*Primary Examiner*—Lee Nguyen
*Assistant Examiner*—Minh D. Dao

(57) ABSTRACT

An apparatus and method for the automatic positioning of information access points. An electronically connected individual (ECI) passes within range of a first information access point (IAP) and obtains location information. Subsequently, the ECI passes within range of a second IAP which hitherto does not have any location information. The location for this second IAP can be estimated based on the location obtained from the first IAP, elapsed time, and the individual's estimated velocity vector. As the ECI passes by a third IAP, the location, elapsed time, and estimated velocity vector data corresponding to the third IAP can be used to refine the location of the second IAP. Over time, the location of the second IAP can be successively refined as ECI's move between IAP's.

21 Claims, 7 Drawing Sheets

APPARATUS AND METHOD FOR THE AUTOMATIC POSITIONING OF INFORMATION ACCESS POINTS

FIELD OF THE INVENTION

The present invention pertains to an apparatus and method for automatically determining the physical location of information access point devices.

BACKGROUND OF THE INVENTION

The convergence of advances in the fields of networking, wireless communications, mobile computing, and the Internet, has made it technologically feasible to provide virtually any type of information and/or services to individuals at virtually anytime and any place. It is envisioned that small, unobtrusive devices can be set up to transmit specific information regarding an object, business, or point of reference associated with that particular device. These devices serve as "information access points" (IAP's) for providing specific, localized information. A passerby, can access this information by pointing his or her personal communications device, such as a cell phone, personal digital assistant, or any type of mobile computing device, at the IAP device and download the transmitted information.

For example, a painting at a museum could have an associated IAP device which continuously broadcasts information regarding that painting. A visitor to the museum who is interested in that painting, could then direct his or her portable communications device at the IAP device to receive textual, audio, and/or visual information regarding that painting. Alternatively, the IAP device could provide the visitor with a URL or some type of pointer to a web site which has the desired information. Furthermore, that person may be interested in finding where other paintings by that same artist may be found in the museum. This would require that the IAP devices have known physical locations (e.g., latitude and longitude). It would be of great benefit were most, if not all, IAP devices to have known locations. An individual could then be directed to the nearest restaurant, restroom, bus stop, hospital, newstand, ATM machine, pay phone, etc., by virtue of the IAP devices.

There exist many different ways by which to establish an IAP device's location. One method entails utilizing traditional surveying techniques to fix the location of an IAP device. Unfortunately, this method is quite time consuming and expensive. As such, traditional surveying techniques are typically limited to known landmarks or to locations of significance. It would be cost prohibitive to survey in each and every one of the multitudes of IAP devices. Another method entails using the Global Positioning System (GPS) to establish the locations of IAP devices. However, GPS generally requires a direct line-of-sight to several of the orbiting satellites. Consequently, GPS cannot be used to establish the locations of indoor IAP devices. Another commonly used technique involves cellular triangulation. Unfortunately, cellular triangulation has limited accuracy (e.g., 100 meters for standard cell sizes and less than 25 meters for microcells). Furthermore, cellular triangulation is susceptible to multi-pathing problems indoors.

Thus, there exists a need for a quick, cost-efficient, and accurate method for automatically determining the location of an IAP device. It would be highly preferable if such an apparatus or method works equally well indoors as well as outdoors. The present invention provides one unique, novel solution to these problems.

DISCLOSURE OF THE INVENTION

The present invention pertains to an apparatus and method for automatically determining the location of information access points (IAP's). An IAP provides information pertaining to an object or point of reference of interest. This information is made available to any electronically connected individual (ECI) within range of the IAP. The physical location of an IAP can be determined by first determining the location of a nearby IAP. The ECI passes within range of a first information access point and obtains location information. Subsequently, the ECI passes within range of a second IAP which hitherto does not have any location information. The location for this second IAP can be estimated based on the location obtained from the first IAP, elapsed time, and the ECI's estimated velocity vector. As the ECI passes by a third IAP, the location, elapsed time, and estimated velocity vector data corresponding to the third IAP can be used to refine the location of the second IAP. Over time, the location of the second IAP can be successively refined to become more accurate as ECI's move between IAP's.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Figure 1:
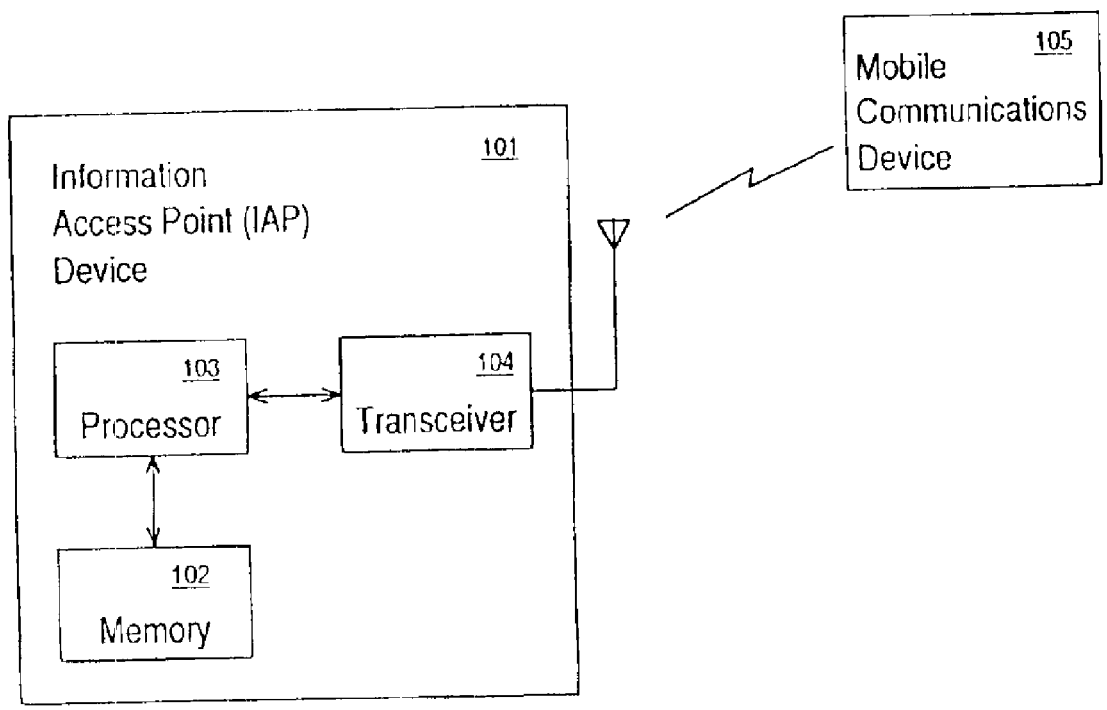
FIG. 1 shows an exemplary information access point (IAP) device upon which the present invention may be practiced.

FIG. 1 shows an exemplary information access point (IAP) device upon which the present invention may be practiced. The IAP device 101 includes a memory 102 (e.g., ROM, RAM, FLASH, etc.) for storing localized information pertinent to the object or some other associated reference. This information could include location data, URL data, price data, description data, etc. Optionally, a small piece of code, stored in memory 102, can be run on processor 103 to provide the IAP device 101 with a bit of intelligence. The data as well as some functionalities provided by the embedded software is transmitted by the transceiver 104 to a nearby mobile communications device 105. The transmission can be handled by means of physically linking the mobile communications device 105 to the IAP device 101 or by means of remote communications, such as via RF (e.g., cellular, 802.11, Bluetooth, etc.); infrared (e.g., IRDA, OBEX, ULTRA, etc.); or some type of tagging technology (e.g., barcodes, RFID, Unique Picture ID's, Picture Water Marking, etc.). It should be noted that the IAP device 101 may or may note be physically connected to a network, hardwired, or wireless.

The mobile communications device 105 receives the information from IAP 101. Thereupon, depending on the type and format of the data, the mobile communications device (e.g., a personal digital assistant, cellular device, etc.) can display text or graphics to the user, play it back as audio, or play back a video clip. This information may be physically stored on the IAP, provided via a network connected to the IAP. Alternatively, information provided by the IAP, such as a URL, may point the mobile communications device to a source of information which it retrieves via a wireless network. Additionally, the physical location of IAP 101 is transmitted to mobile communications device (MCD) 105 via stored information in the IAP, or a network connection accessed by the IAP or via an independent wireless network path as identified by the IAP, such as a URL address. Thus, if a user associates himself or herself with the IAP device 101 via a data transfer, and the IAP device 101 has a known physical location (longitude, latitude, and elevation), the user is able to determine their general location because of their proximate vicinity to the IAP device 101. The accuracy of this position will be the combination of the position accuracy of the IAP device 101 and the distance that the user is from the IAP device 101. In some cases, there may be some error because the distance may not always be easily determined. In other cases, this accuracy can be predicted based upon the environment of the IAP device and the known mobility of the user. For example, suppose that the IAP device 101 resides inside a mall. The accuracy of positioning might change based upon the walking speed of a user. Conversely, if the IAP device 101 were located outside and the user is driving a car, the accuracy degrades much more rapidly.

In one embodiment, a mobile communications device 105 may include Dead Recognizing (DR) technologies, such as but not limited to an electronic compass, accelerometers, etc., to enable a user to move away from an IAP device and still maintain a reasonably accurate position. The accuracy of the position will degrade based upon the accuracy versus time characteristics of the DR device(s). Moreover, within an environment, such as a mall, some IAP devices (e.g., an information kiosk) will be surveyed in and will have a precise location, whereas others may have a less precise location information or even no location information whatsoever.

In the currently preferred embodiment of the present invention, for those IAP devices with poor or no location information, their locations can be estimated and refined over time by collecting position information from one or more nearby mobile communications devices. Thus, by using standard mathematical techniques, the IAP device's location can be initially approximated and later refined with each contact with subsequent other mobile communications devices containing position information. Likewise, in a reciprocal manner, if a mobile communications device has poor location knowledge, its position information can be successively refined as it obtains additional position data from subsequent IAP devices. Some mathematical algorithms which may be thusly utilized include Kalman filtering, and may be found in the following references: Brown, R. G. and P. Y. C. Hwang, "Introduction to Random Signals and Applied Kalman Filtering," Second Edition, John Wiley & Sons, Inc. (1992); Gelb, A., "Applied Optimal Estimation," MIT Press, Cambridge, Mass. (1974); Grewal, Mohinder S., and Angus P. Andrews, "Kalman Filtering Theory and Practice" Upper Saddle River, N.J. USA, Prentice Hall (1993); Jacobs, O. L. R. 1993, "Introduction to Control Theory, 2nd Edition," Oxford University Press (1993); Julier, Simon and Jeffrey Uhlman, "A General Method of Approximating Nonlinear Transformations of Probability Distributions," Robotics Research Group, Department of Engineering Science, University of Oxford (cited 14 Nov. 1995); "A New Approach for Filtering Nonlinear Systems" by S. J. Julier, J. K. Uhlmann, and H. F. Durrant-Whyte, Proceedings of the 1995 American Control Conference, Seattle, Wash., Pages:1628–1632; Kalman, R. E. 1960, "A New Approach to Linear Filtering and Prediction Problems," Transaction of the ASME—Journal of Basic Engineering, pp. 35–45 (March 1960); Lewis, Richard, "Optimal Estimation with an Introduction to Stochastic Control Theory," John Wiley & Sons, Inc. (1986); Maybeck, Peter S., "Stochastic Models, Estimation, and Control," Volume 1, Academic Press, Inc. (1979); Sorenson, H. W., "Least-Squares estimation: from Gauss to Kalman," IEEE Spectrum, vol. 7, pp. 63–68, (July 1970).

Figure 2:
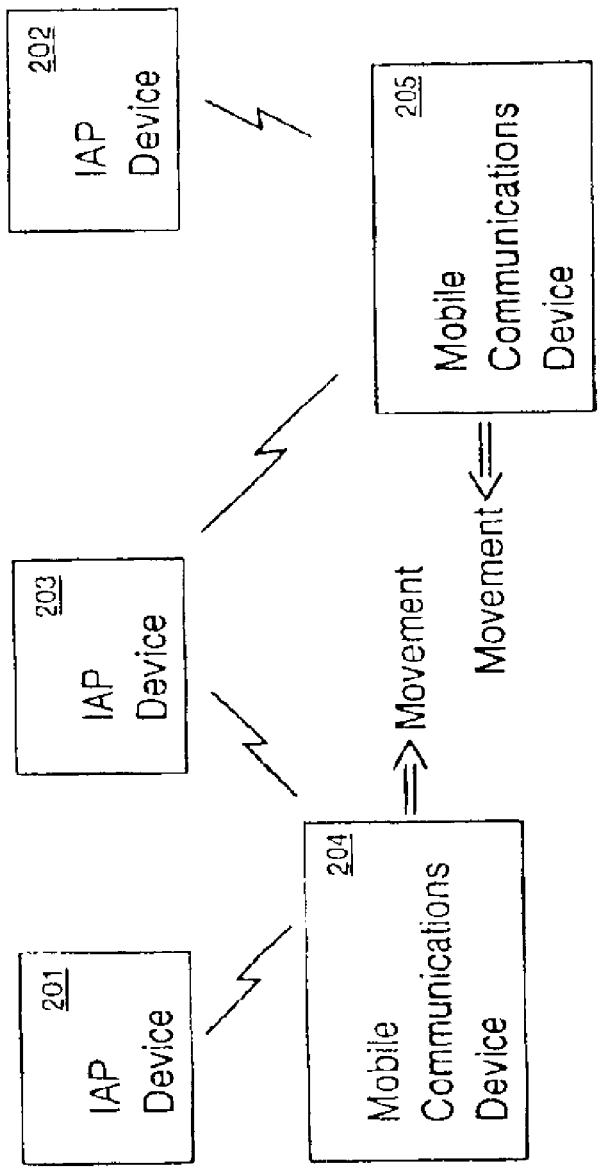
FIG. 2 shows one embodiment of how location information is refined.

FIG. 2 shows one embodiment of how location information is refined. In this example, IAP device 201 and IAP device 202 have known locations, whereas IAP device 203 is new and does not yet have a location. A first passerby having a mobile communications device 204 passes by IAP device 201. Mobile communications device 204 receives location information from IAP device 201. A short time later, the first passerby walks past IAP device 203, at which point, mobile communications device 204 transmits its last known location (which it had obtained from IAP device 201). In addition, the mobile communications device 204 transmits its relative accuracy based upon elapsed time from its last known location and an estimated velocity vector. This information is used by the IAP device 203 to establish an initial position and an estimated accuracy corresponding to that initial position. Subsequently, a second passerby having a mobile communications device 205 receives location data associated with IAP device 202. This second passerby walks past IAP device 203. At this point, mobile communications device 205 transmits its last known location (as received from IAP device 202) to IAP device 203. It also transmits a relative accuracy based upon the elapsed time and an estimated velocity vector. This data gives IAP 203 a second position estimate. Standard mathematical approximation and/or filtering techniques are used to combine the first position estimate with the second position estimate in order to refine the location of IAP device 203. This process of position and accuracy estimates will improve over time with each successive passerby transmitting his or her estimated position to IAP device 203. In one embodiment, the transmission may refer to directly providing the information to the IAP or via an independent network path to a service mapping the IAP's position or via an independent network path back to the IAP It should be noted that the location of an individual can be determined or estimated as a function of the position information obtained from one or more IAP devices.

Furthermore, the accuracy of the location improves as the location of the IAP devices becomes more accurate. Furthermore, a mobile communications device can exchange location information with one or more other mobile communications devices. This sharing of information serves to increase the overall accuracy of the IAP network.

Figure 3:
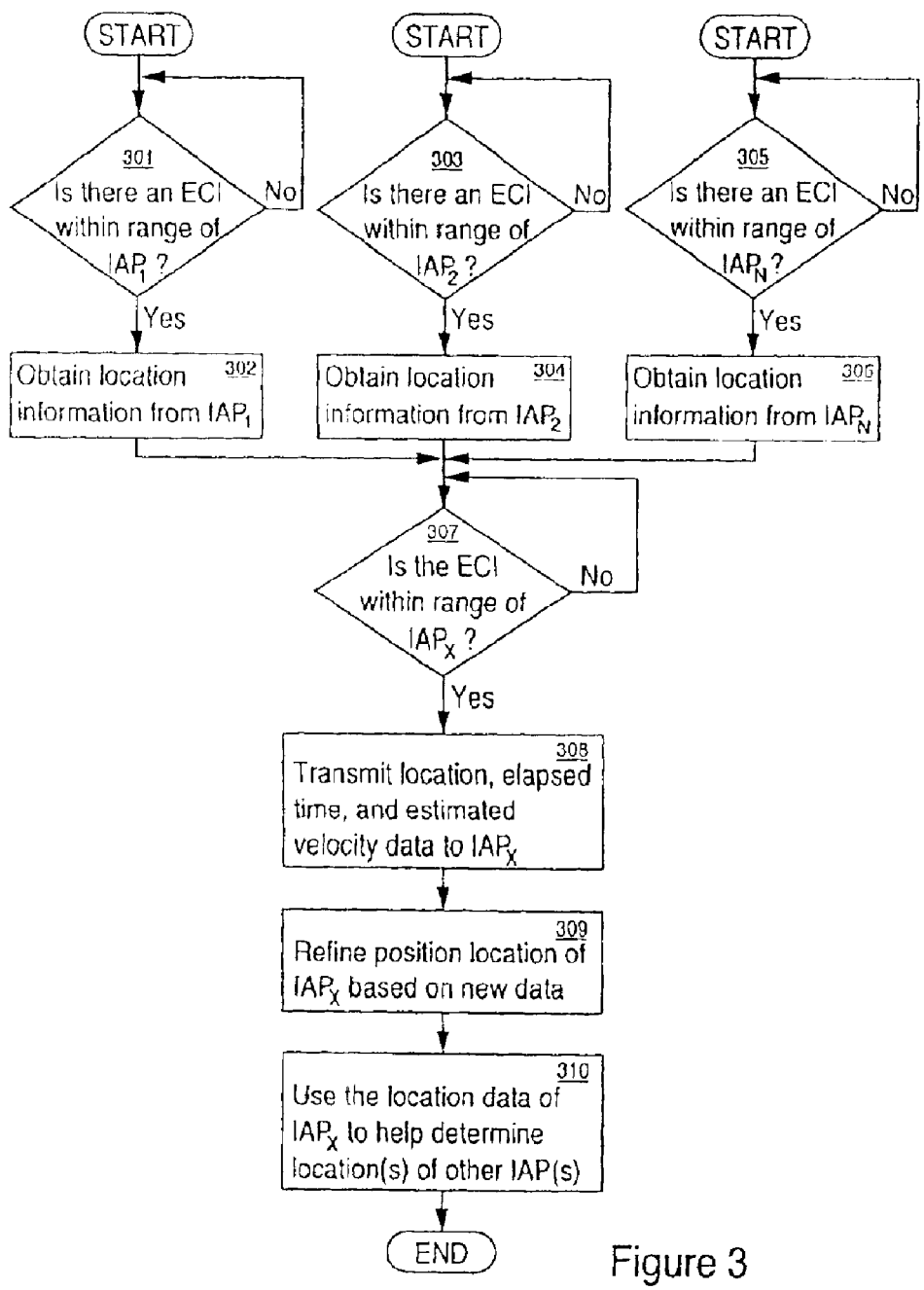
FIG. 3 shows a flowchart describing the process of location refinement for an IAP device.

FIG. 3 shows a flowchart describing the process of location refinement for an IAP device. Initially, there are a number of IAP's with location information ($IAP_1$, $IAP_2$, . . . $IAP_N$) near the $IAP_X$ which does not have a known location. An Electronically Connected Individual (ECI) who has a mobile communications device, passes by one of the IAP's. For instance, in step 301, an ECI passes by within range of $IAP_1$. This ECI obtains location information associated with $IAP_1$, step 302. Likewise, when an ECI passes by $IAP_2$, step 303, it obtains the location information associated with $IAP_2$, step 304. This process repeats for each IAPN which happens to be near the vicinity of $IAP_X$, steps 305 and 306. $IAP_X$ is continuously monitoring the ECI's which happen to be within its vicinity, step 307. $IAP_X$ interrogates each of the ECI's within its vicinity or periodically ECI's will report positions to determine its location information, elapsed time, and estimated velocity, step 308. Thereby, if an ECI which has $IAP_1$ data happens to be within range of $IAP_X$, then the location information of $IAP_1$ is transmitted to $IAP_X$. In addition, the estimated velocity of the ECI (if known) is also transmitted to $IAP_X$. Furthermore, the time elapsed since the ECI last obtained the location information pertaining to $IAP_1$ is transmitted to $IAP_X$. The $IAP_X$ can use this information to determine its own estimated location.

As additional new data from other ECI's containing data relating to the same or different IAP's are transmitted to $IAP_X$, the location of $IAP_X$ can be successively refined over time, step 309. There exist well-known mathematical algorithms which can refine old data based on new data. One such technique is referred to as Kalman filtering. Once the location of $IAP_X$ has sufficiently been refined, this location can now be used to help establish the position of another IAP. It becomes a domino effect whereby establishing initial positions of a few known IAP's will lead to the determination of additional IAP's which had hitherto unknown locations. In turn, these new IAP's can be used to determine the locations of other IAP's, etc. Thereby, the present invention provides a relatively fast, easy, automatic, and cost-efficient method for establishing the locations of IAP devices. Moreover, the location accuracy improves over time as more IAP's are added and further refinements are continuously updated. In other words, this process of position and accuracy estimates improve over time with each ECI passage.

Figure 4:
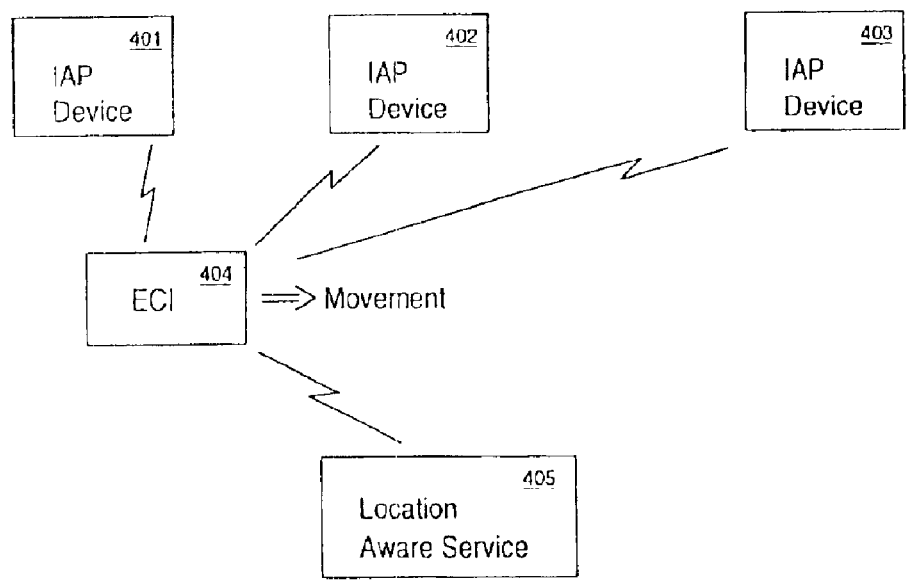
FIG. 4 shows one embodiment of the present invention whereby a location aware service is used to refine position location of an IAP.

FIG. 4 shows one embodiment of the present invention whereby a location aware service is used to refine position location of an IAP. In this embodiment, two or more IAP's having known locations are used to determine and/or refine the location of another IAP with the assistance of a location aware service (LAS). For instance, given that IAP device 401 and IAP device 403 already have known locations, the location of IAP device 402 can be determined with the help of an ECI 404 acting in conjunction with LAS 405. First, the ECI 404 receives its "beacon code" or URL as it passes by IAP device 401. The ECI obtains its location from the LAS 405 which contains location information pertaining to IAP device 401. The ECI 404 continues moving towards the unknown IAP device 402. ECI 404 informs the LAS 405 that he or she is within the range of IAP device 402. The LAS 405 is then able to compute a position and accuracy for IAP device 402 based upon the ECI's last acquired position (i.e., from IAP device 401), elapsed time, and estimated velocity vector. This establishes an initial position and estimated accuracy for IAP device 402. The same ECI, upon moving within range of IAP device 403, notifies this fact to LAS 405. At this point, the LAS 405 can use the internally stored location information associated with IAP device 403, the elapsed time, and estimated velocity vector to refine the position and accuracy of IAP device 402. Again, the refinement can be performed by standard mathematical algorithms, such as by Kalman filtering.

Figure 5:
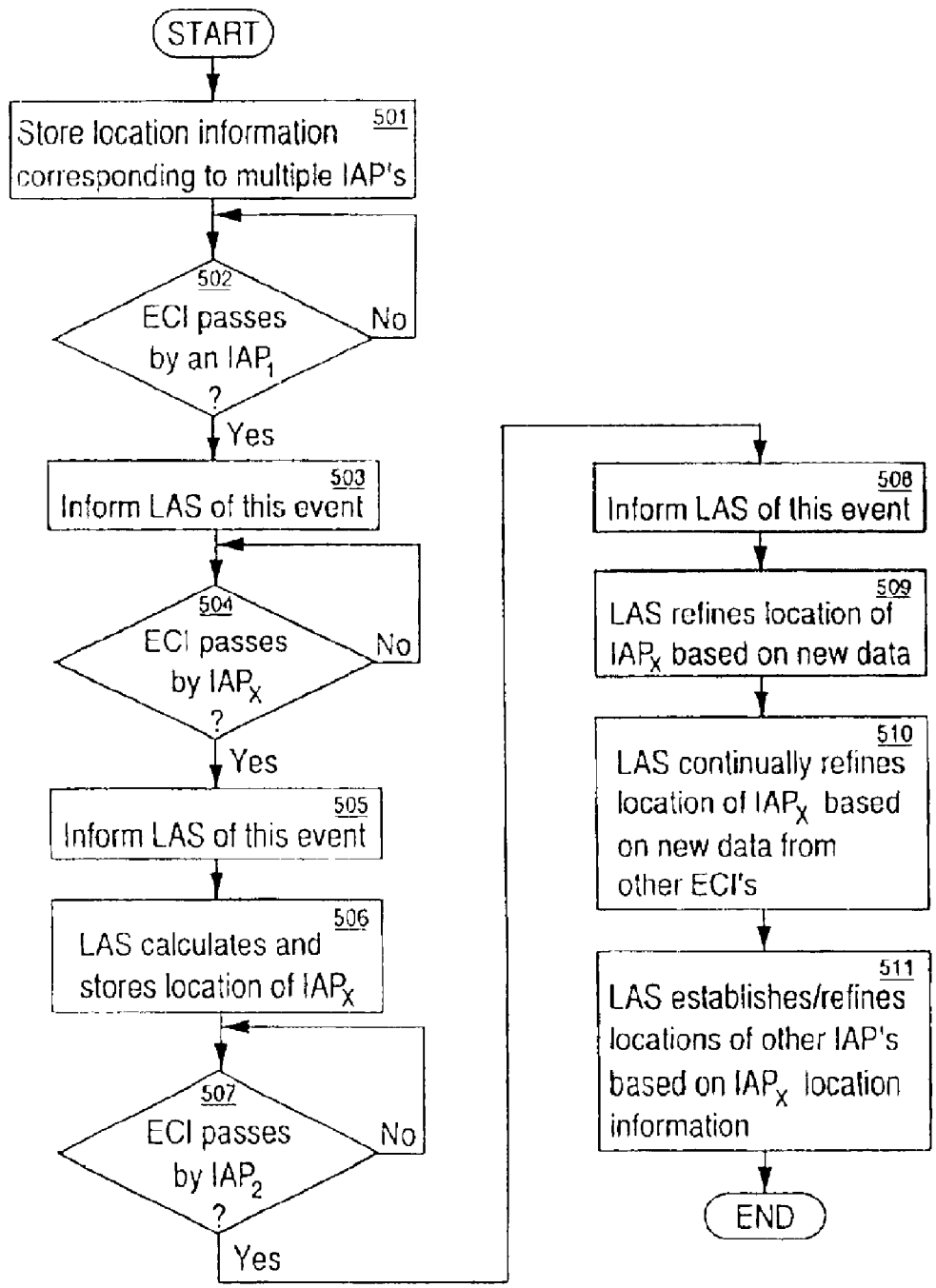
FIG. 5 is a flowchart describing the steps for using a Location Aware Service to aid in the establishment and refinement of location data for an IAP.

FIG. 5 is a flowchart describing the steps for using a Location Aware Service to aid in the establishment and refinement of location data for an IAP. Initially, the locations of a number of IAP's are stored by the LAS, step 501. An ECI passes within range of an $IAP_1$, step 502. The mobile communications device of the ECI notifies the LAS of this event, step 503. Subsequently, the ECI passes within range of $IAP_X$, step 504. Again, the ECI notifies the LAS when this event occurs, step 505. The LAS looks up the location of $IAP_1$ and calculates the estimated location of $IAP_X$ based on the location of $IAP_1$, the elapsed time, and the estimated velocity vector, step 506. This location information for $IAP_X$ is stored by the LAS. Later, if the ECI happens to pass by another IAP (e.g., $IAP_2$ in step 507), the LAS is immediately notified of this event, step 508. The LAS then refines the location information for $IAP_X$ based on this new data, step 509. The LAS can continually refine the position of $IAP_X$ based on new data collected from other ECI's, step 510. In like manner, the location of $IAP_X$ can be used to help establish and/or refine locations of other nearby IAP's, step 511.

Figure 6:
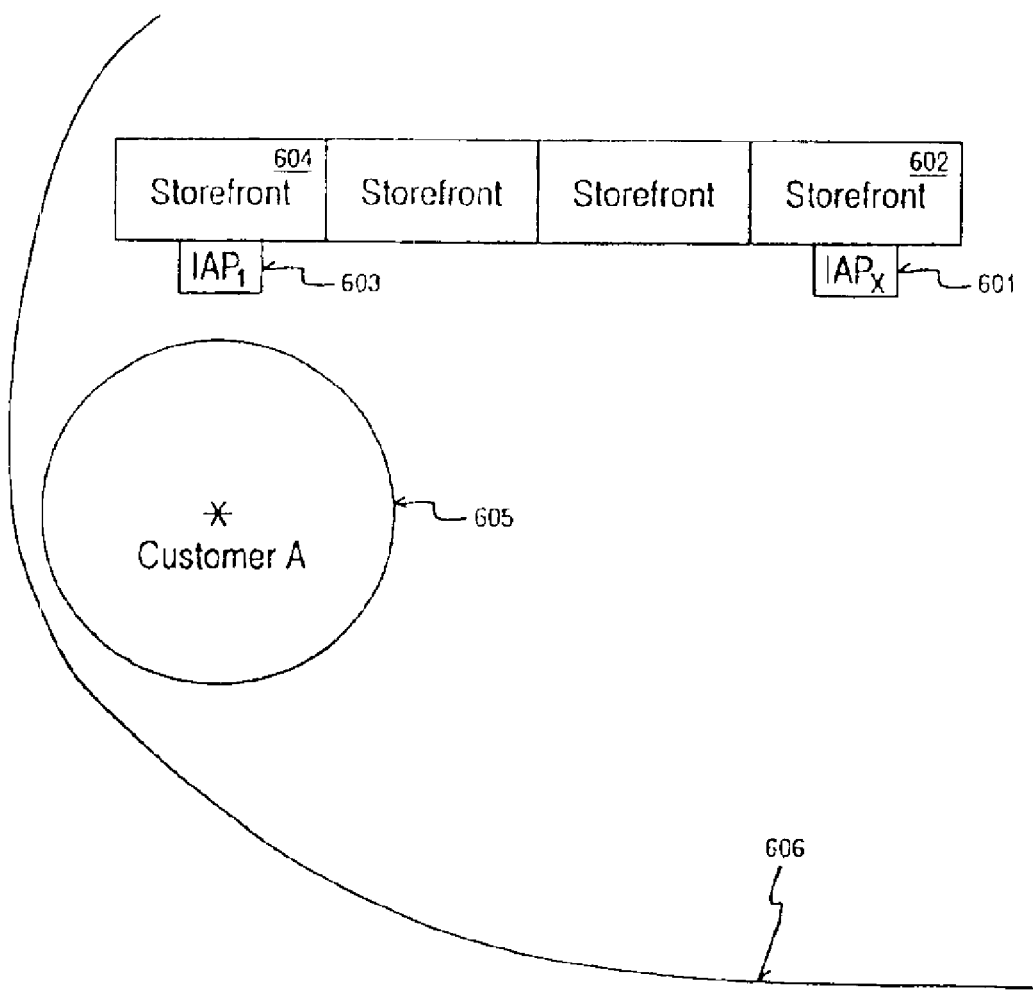
FIG. 6 shows one embodiment whereby the present invention establishes the location of an indoor IAP.

FIG. 6 shows one embodiment whereby the present invention establishes the location of an indoor IAP and that IAP is simply represented by a virtual point in 3D space. Suppose that the virtual IAPs reside within a relatively large indoor area, such as a shopping mall. The mall already has a number of virtual IAP's, possibly fixed in front of the stores, that have already been surveyed in or located in physical space. A shop owner creates a new virtual $IAP_X$ 601 for his or her storefront 602. Having no better location information, the shopowner identifies a virtual $IAP_1$ 603 three shops away (storefront 604) and places his/her virtual $IAP_X$ at that location. The position is set for the specified location with an accuracy reflecting the fact that the virtual $IAP_X$ has been inaccurately positioned. Now, customers within the mall will help establish a position and accuracy via a variety of means from IAP devices which already have established locations (e.g., physical beacons, access points using 802.11b, Bluetooth, etc., or other virtual IAP's). The customer position accuracy decreases with time based upon a user mobility model.

In this embodiment, the MCD may have directional capability and possibly ranging capability. As such, this device can identify virtual IAP's. For instance, a Customer "A" stops near Storefront 604, and using his MCD, points at the store and obtains "nearby" IAP's. While currently three stores away, the customer will receive the signal from $IAP_X$ since current location estimate of $IAP_X$ falls within the customer's location search window. Furthermore, $IAP_X$ is located by the MCD since its estimated position accuracy sphere falls within the user inquiry window. It should be noted that the position estimated accuracy for Customer "A" is given by 605. And the initial position estimate accuracy for $IAP_X$ is given by 606.

Figure 7:
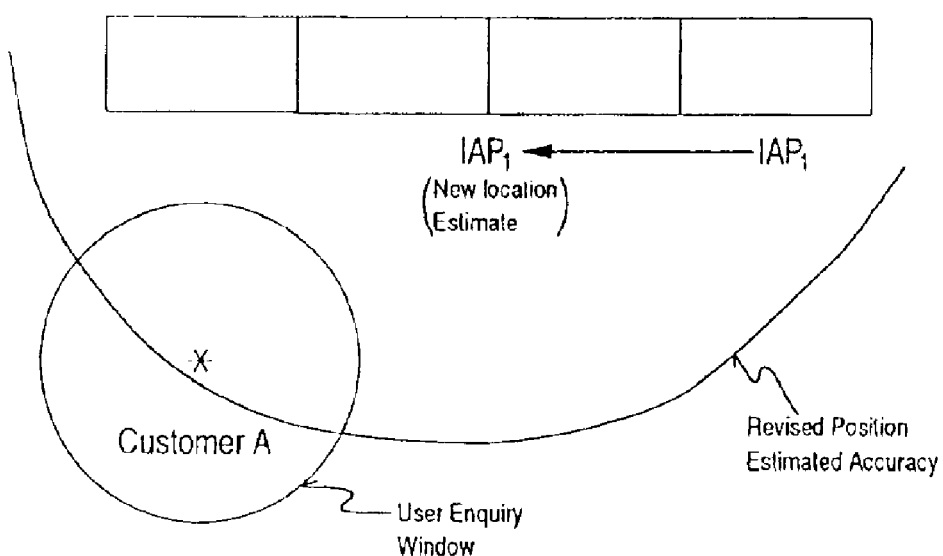
FIG. 7 shows one embodiment whereby the location of the IAP does not fall within a predicted location window.

Next, it is possible to refine the location and location accuracy of $IAP_X$ given: 1) the user's position and position estimate, 2) the MCD search vector, and 3) the predicted user's range of interest (e.g., 100 feet in a mall). Given this information, a predicted location of the IAP may be computed along with an error estimate. If the current position of the beacon does not fall within the predicted location window, then the beacon's position may be refined by a filter mechanism, such as a Kalman filter, as shown in FIG. 7. Over time, with additional customer inquires and refined customer position information, the $IAP_1$'s position will be come positioned properly and accurately at the storefront.

Therefore, the preferred embodiment of the present invention, an apparatus and method for automatically determining the physical location of information access point devices, is thus described. While the present invention has been described in particular embodiments, it should be appreciated that the present invention should not be construed as limited by such embodiments, but rather construed according to the below claims.

What is claimed is:

1. A method for establishing a physical location of a first access point which provides information corresponding to an object, comprising:
   determining when a first mobile communications device is within range of a second access point having a known physical location;
   determining when the first mobile communications device is within range of the first access point;
   transmitting data to the first access point, wherein the data includes the physical location of the second access point;
   determining the physical location of the first access point based on the data from the first mobile communications device.

2. The method of claim 1 further comprising:
   determining when a second mobile communications device is within range of a third access point having a known physical location;
   determining when the second mobile communications device is within range of the first access point;
   transmitting data to the first access point, wherein the data includes the physical location of the third access point;
   refining the physical location of the first access point based on the data from the second mobile communications device.

3. The method of claim 2 further comprising:
   successively refining the location of the first device based on data supplied by additional mobile communications devices.

4. The method of claim 3 further comprising:
   performing a Kalman filtering technique to refine the physical location of the first access point.

5. The method of claim 1, wherein the data includes elapsed time and an estimated velocity vector.

6. The method of claim 1, wherein the data is transmitted wirelessly.

7. The method of claim 1, wherein locations of additional access points are determined and refined based on the determining and transmitting process.

8. A method for establishing a physical location of a first access point, comprising:
   storing location information corresponding to a plurality of access points by a service;
   determining when an individual passes by a first access point, wherein the first access point has a known location stored by the service;
   determining when the individual passes by a second access point;
   calculating a location corresponding to the second access point based on the location of the first access point.

9. The method of claim 8 further comprising:
   determining when the individual passes by a third access point, wherein the third access point has a known location stored by the service;
   refining the location corresponding to the second access point based on the location of the third access point.

10. The method of claim 9 further comprising:
    using a Kalman filtering technique to refine the location of the second access point.

11. The method of claim 8, wherein the location corresponding to the second access point is refined based on elapsed time and velocity vector information.

12. The method of claim 8, wherein data is transmitted wirelessly between individual and the service.

13. The method of claim 8, wherein locations for a plurality of access points are successively established and refined based on data supplied by individuals passing by access points having known locations.

14. A network of information access points, comprising:
    a plurality of information access points associated with objects or point of references having known physical locations;
    a mechanism for establishing a physical location of a particular information access point by collecting information from a plurality of electronically connected individuals, wherein the physical location is refined over time as the electronically connected individuals move between the plurality of information access points having known physical locations.

15. The network of claim 14, wherein the location of one electronically connected individual improves as the accuracy of the locations of the information access point improves.

16. The network of claim 14, wherein the electronically connected individuals exchange position and accuracy information.

17. The network of claim 14 further comprising a plurality of virtual information access points.

18. A location aware service for automatically establishing a physical location of a particular information access point, comprising:
    a memory for storing physical locations corresponding to a plurality of information access points;
    a receiver coupled to the memory which receives data from electronically coupled individuals as they pass by information access points;
    a processor coupled to the receiver which determines the physical location for the particular information access point based on the data received from the electronically coupled individuals.

19. The location aware service of claim 18, wherein the processor refines the physical location for the particular information access point according to a Kalman filtering technique.

20. The location aware service of claim 18, wherein the information access points transmit URL information to the electronically coupled individuals.

21. The location aware service of claim 18 further comprising a transmitter for transmitting location data to the electronically coupled individuals.

* * * * *